United States Patent [19]

Beckberger

[11] Patent Number: 4,719,000

[45] Date of Patent: Jan. 12, 1988

[54] UPGRADING PETROLEUM ASPHALTENES

[75] Inventor: LaVern H. Beckberger, Markham, Ill.

[73] Assignee: Atlantic Richfield Company, Los Angeles, Calif.

[21] Appl. No.: 596,173

[22] Filed: Apr. 2, 1984

[51] Int. Cl.$^4$ .................. C10G 1/20; C10G 19/08; C10G 45/10

[52] U.S. Cl. .................. 208/44; 208/208 R; 208/240; 208/232; 208/208 M

[58] Field of Search ........... 208/208 R, 240, 232, 208/231, 229, 227, 39, 44, 208 M

[56] References Cited

U.S. PATENT DOCUMENTS

| | | | |
|---|---|---|---|
| 3,989,618 | 11/1976 | McCollum et al. | 208/208 R |
| 4,248,695 | 2/1981 | Swanson | 208/208 R |
| 4,313,737 | 2/1982 | Massey et al. | 44/1 C |
| 4,364,740 | 12/1982 | Massey et al. | 44/1 C |
| 4,392,946 | 7/1983 | Estes et al. | 208/208 R |
| 4,483,761 | 11/1984 | Paspek, Jr. | 208/106 |

*Primary Examiner*—Helen M. S. Sneed
*Assistant Examiner*—Chung K. Pak
*Attorney, Agent, or Firm*—F. Lindsey Scott

[57] ABSTRACT

1. A process for reducing the sulfur content of petroleum asphaltenes containing sulfur comprising:
   (1) forming a mixture of petroleum asphaltenes containing sulfur and a liquid selected from the group consisting of water, methanol, carbon dioxide and mixtures thereof;
   (2) raising the temperature and pressure of the mixture to a temperature and pressure above the critical temperature and pressure of the liquid to convert the liquid to a supercritical fluid;
   (3) maintaining the mixture above the critical temperature and pressure of the liquid for a time sufficient to effect sulfur reduction;
   (4) reducing the pressure to a second lower pressure; and
   (5) recovering petroleum asphaltenes reduced in sulfur.

9 Claims, No Drawings

UPGRADING PETROLEUM ASPHALTENES

BACKGROUND OF THE INVENTION

1. Field of the Invention

The field of this invention relates to a process for upgrading sulfer-containing petroleum asphaltenes.

2. The Prior Art

High sulfur petroleum asphaltenes are not a desirable fuel and are not a desirable feedstock for producing other petroleum products.

Heretofore, low sulfur petroleum asphaltenes have been obtained by employing low sulfur crude oils or hydrodesulfurized feedstocks. Low sulfur crude oils, however, are expensive and are becoming increasingly less available, especially in North America. Hydrodesulfurization is also expensive because it is capital intensive and consumes valuable hydrogen.

Heretofore, it has been proposed to use water heated to supercritical temperature and pressure in a process to shatter coal in a manner such that coal particles and mineral matter particles can be separated. For example, U.S. Pat. No. 4,313,737 to Massey, et al. discloses a process for treating coal, oil shale or other porous, fluid-permeable, friable hydrocarbonaceous solid containing an admixture of hydrocarbonaceous particles and mineral matter particles with water heated to supercritical temperature and pressure and then rapidly reducing the pressure to shatter the friable hydrocarbonaceous solid containing mineral matter in a manner such the mineral matter can be separated from the hydrocarbonaceous material. Separating the mineral matter from the hydrocarbonaceous mineral can reduce the sulfur content of the hydrocarbonaceous matter because sulfur is often associated with the mineral matter.

High sulfur petroleum asphaltenes are not hydrocarbonaceous material containing mineral matter such as disclosed in the process of the above patent as being amenable to beneficiation in the process described. Rather, asphaltenes are non-pourous dark brown to black friable solids that have no definite melting point, and when heated, usually intumesce, then decompose leaving a carbonaceous residue. They can be obtained from petroleums and bitumens by addition of a nonpolar solvent (such as a hydrocarbon) with a surface tension lower than 25 dynes cm$^{-1}$ at 25° C. (such as liquefied petroleum gases, the low-boiling petroleum naphthas, petroleum ether, pentane, isopentane, and hexane) but are soluble in liquids having a surface tension above 25 dynes cm$^{-1}$ (such as pyridine, carbon disulfide, carbon tetrachloride, and benzene).

Asphaltenes have been characterized in a variety of ways, see, for example, "Chemistry of Asphaltenes", Advances in Chemistry Series, No. 195, Burger & Li, Copyright 1981 by the American Chemical Society, incorporated herein by reference.

It now has been surprisingly found that high sulfur petroleum asphaltenes can be treated with a fluid comprising water, methanol, carbon dioxide and mixtures thereof, at supercritical temperatures and pressures in order to reduce or eliminate sulfur associated with petroleum asphaltenes. The sulfur reduction that occurs is not due to size reduction, but rather is apparently due to chemical reactions which occur at these conditions.

Since prior art processes for obtaining low sulfur petroleum asphaltenes are becoming increasingly less desirable, this discovery can be quite useful since it portends new more desirable processes for obtaining low sulfur petroleum asphaltenes.

SUMMARY OF THE INVENTION

In summary, this invention provides a process for reducing the sulfur content of petroleum asphaltenes containing sulfur comprising:

(1) forming a mixture of petroleum asphaltenes containing sulfur and a liquid selected from the group consisting of water, methanol, carbon dioxide and mixtures thereof;

(2) raising the temperature and pressure of the mixture to a temperature and pressure above the critical temperature and pressure of the liquid to convert the liquid to a supercritical fluid;

(3) maintaining the mixture above the critical temperature and pressure of the liquid for a time sufficient to effect sulfur reduction;

(4) reducing the pressure to a second lower pressure; and (5) recovering petroleum asphaltenes reduced in sulfur.

DETAILED DISCUSSION OF THE INVENTION AND ITS PREFERRED EMBODIMENTS

In its broad aspect, this invention presents a process for reducing the sulfur content of petroleum asphaltenes containing sulfur comprising:

(1) forming a mixture of petroleum asphaltenes containing sulfur and a liquid selected from the group consisting of water, methanol, carbon dioxide and mixtures thereof;

(2) raising the temperature and pressure of the mixture to a temperature and pressure above the critical temperature and pressure of the liquid to convert the liquid to a supercritical fluid;

(3) maintaining the mixture above the critical temperature and pressure of the liquid for a time sufficient to effect sulfur reduction;

(4) reducing the pressure to a second lower pressure; and (5) recovering petroleum asphaltenes reduced in sulfur.

The first step of the process of this invention involves forming a mixture of petroleum asphaltenes containing sulfur and a liquid selected from the group consisting of water, methanol, carbon dioxide and mixtures thereof. Preferably, the petroleum asphaltenes are in the form of finely divided particles, preferably, sufficient liquid is available so that the mixture is an easily pumpable mass for ease in handling. For example, a suitable mixture for use in this invention can contain from about 1 part, by weight, petroleum asphaltenes containing sulfur and from about 0.3 to about 3 parts, by weight, liquid.

In the second step of the process of this invention, the temperature and pressure of the mixture are raised above the critical temperature and pressure of the liquid to convert the liquid to a supercritical fluid.

As used in the description of the present invention, the term "critical" temperature and pressure of a liquid refers to the temperature and pressure at which the vapor phase and the liquid phase of the liquid can no longer be distinguished, i.e., the phases merge. "Critical temperature" refers to the temperature of the liquid vapor at the critical point, that is, the temperature above which the substance cannot be liquified at any pressure. "Critical pressure" refers to the vapor pressure of the liquid at the critical temperature. A liquid which has been pressurized above its critical pressure and heated above its critical temperature is referred to as a "supercritical fluid." The critical temperature and pressure of water are about 705° F. and about 3206 psia. The critical temperature and pressure of methanol is about 464° F. and 1155 psia. The critical temperature and pressure of carbon dioxide are about 88° F. and 1073 psia.

The pressure and temperature to which the mixture is subjected are preferably less than about 16,000 psia and about 1,000° F., respectively. These upper limits, however, are primarily determined by design safety considerations based on known current materials and methods of construction only. Preferred pressures are between about critical pressure of the liquid and about 16,000 psia. Particularly preferred pressures are between about 5,000 psia and about 15,000 psia, and particularly preferred temperatures are between 750° F. and about 950° F. for water. Particularly preferred temperatures are between about 500° F. and about 950° F. for methanol. Particularly preferred temperatures are between about 100° F. and 950° F. for carbon dioxide.

The mixture is maintained above the critical temperature and pressure of the liquid for a period of time to effect sulfur reduction.

The mixture is preferably maintained above the critical temperature and pressure of the liquid for only a short period of time. The exact time is determined primarily by the exact temperature and pressure imposed on the mixture. Generally, a time period less than about 30 seconds is sufficient to effect substantial sulfur reduction.

The pressure on the mixture is then reduced to a second lower pressure. The second lower pressure is generally substantially below the critical pressure of the fluid, preferably near ambient pressure, i.e., less than about 75 psia. The temperature of the mixture drops, as a result of the energy associated with the expansion of the fluid, to a second lower temperature. If water is employed, preferably the second lower temperature is above the dew point of the water at the second pressure. At ambient pressure, the preferred temperature is above 250° F. and is preferably about 260°-300° F.

In a preferred aspect of this invention, the reduction in pressure is substantially instantaneous. Preferably, the pressure reduction takes place within less than about 100 microseconds, more preferably within less than about 10 microseconds, and most preferably within less than about 1 microsecond.

In the final step of the process of this invention, the petroleum asphaltenes product reduced in sulfur in accordance with the process steps hereinbefore discussed is recovered. Recovery of the petroleum asphaltenes product reduced in sulfur can be accomplished by a variety of conventional mechanisms, for example, as a solid product in a bag filter.

The process of this invention for upgrading petroleum asphaltenes can be conducted on a batch or continuous process basis. For example, on a batch basis, a mixture of the petroleum asphaltenes containing sulfur and liquid comprising water, methanol, carbon dioxide and mixtures thereof is placed in a suitable pressure vessel and the vessel sealed. The mixture is then brought to the desired temperature and pressure using any of a number of conventional techniques available to those skilled in the art. The mixture is held at the temperature and pressure for a time sufficient to effect sulfur reduction. The pressure is then reduced, lowering the temperature, and a petroleum asphaltenes product reduced in sulfur is recovered.

The process can also desirably be conducted on a continuous basis. For example, a readily pumpable mixture of petroleum asphaltenes containing sulfur and liquid comprising water, methanol, carbon dioxide or mixtures thereof is formed.

An electrolyte is preferably added to the mixture. The electrolyte is preferably a solution of hydroxide salts having a basic pH, such as sodium hydroxide, calcium hydroxide or ammonium hydroxide. The electrolyte can provide a preferred method of controlling the temperature of the reactor and to increase the temperature operating range in a manner as discussed below. Also, the hydroxide salts react with the sulfur compounds released from the petroleum asphaltenes to form water soluble salts.

The mixture is passed, as needed, to a feed system which preferably delivers the mixture at a constant pressure equal to the desired operating pressure in a heating zone. The desired pressure is greater than the critical pressure of the liquid which is used to make the mixture, i.e., for water about 3200 psia and less than about 16,000 psia, preferably between about 4,000 and about 16,000 psia when the liquid is water. The upper limit of the reactor operating pressure is determined principally by the temperature and pressure rated capacity of the apparatus components.

The pressurized mixture is then delivered to a heating chamber wherein the temperature of the mixture is raised to a predetermined temperature above the critical temperature of the liquid which, in the case of water, is about 750° F., and preferably below about 1000° F. Particularly preferred temperatures are between about 750° F. and about 950° F. The supercritical temperatures and pressures produce a supercritical fluid.

Although many methods may be used to heat the mixture, the heating chamber preferably comprises an electrode positioned within a chamber adapted to operate at high temperatures and pressures. As the mixture is passed through the chamber, an electrical current is passed from the electrode through the mixture to the chamber wall. The resistance of the mixture is thus used as a method of directly heating the mixture passed to the heating chamber. A mixture with high solids content, about 50 to 75 by weight percent solids, is preferred.

The pressurized, heated mixture is held in the heating chamber for a predetermined length of time sufficient to effect sulfur reduction of the petroleum asphaltenes. The optimum residence time is dependent on the temperature and pressure, and the sulfur content of the petroleum asphaltenes employed in forming the mixture. Generally preferred residence times are less than 30 seconds in the preferred pressure and temperature range.

The heated and pressurized mixture is then passed to an expansion unit wherein the high pressure imposed on the mixture is reduced rapidly, preferably in a substantially instantaneous fashion. The pressure to which the mixture is reduced is below the critical pressure of the liquid and is preferably about ambient pressure, i.e., about 75 psia or lower. The temperature of the mixture drops as a result of the adiabatic expansion of the fluid in the mixture. Preferably, for solids recovery, however, the temperature drop is controlled to provide a temperature above the dew point of the liquid at the second pressure to prevent vapor condensation which can interfere with the ease of solids recovery. Particularly preferred final temperatures after expansion are about 250° F. with water.

The expansion unit preferably is a device including a high pressure adiabatic expansion orifice having a small opening sufficient to permit the petroleum asphaltenes to pass without plugging. The design of the orifice preferably includes an opening which provides for passage of the mixture across the opening in less than about 10 microseconds, preferably in less than about 1 microsecond. The design of this orifice insures that the reduction in the pressure imposed on the petroleum asphaltenes will occur substantially instantaneously, preferably in less than 100 microseconds. Particularly preferred times for this pressure reduction are less than about 10 microseconds and most particularly preferred are less than about 1 microsecond.

What is claimed is:

1. A process for reducing the sulfur content of petroleum asphaltenes containing sulfur comprising:
   (1) forming a mixture in a proportion of about 1:0.3 to 1.3 of petroleum asphaltenes containing sulfur and a liquid selected from the group consisting of water, methanol, carbon dioxide and mixtures thereof;
   (2) raising the temperature and pressure of the mixture to a temperature and pressure above the critical temperature and pressure of the liquid to convert the liquid to a supercritical fluid.
   (3) maintaining the mixture above the critical temperature and pressure of the liquid for only a short time less than about 30 seconds and sufficient to effect sulfur reduction;
   (4) reducing the pressure to a second lower pressure of less than about 75 pounds per square inch (psia); and
   (5) recovering petroleum asphaltenes reduced in sulfur.

2. The process of claim 1 wherein the pressure is reduced in step 4 substantially instantaneously in less than about 100 micro seconds.

3. The process of claim 2 wherein the liquid is water.

4. The process of claim 2 wherein the liquid is methanol.

5. The process of claim 2 wherein the liquid is carbon dioxide.

6. The process of claim 1 wherein the liquid is water and the temperature is from about 750° F. to about 950° F.

7. The process of claim 1 wherein the liquid is methanol and the temperature is from about 500° F. to about 950° F.

8. The process of claim 1 wherein the liquid is $CO_2$ and the temperature is from about 100° F. to 950° F.

9. The process of claim 1 wherein the liquid contains an electrolyte capable of capturing sulfur compounds.

* * * * *